United States Patent

Yong et al.

[11] Patent Number: 6,096,385
[45] Date of Patent: Aug. 1, 2000

[54] METHOD FOR MAKING MAGNETIC DISKS WITH UNEVEN DISTRIBUTION OF BONDED/UNBONDED LUBRICATING MOLECULES

[75] Inventors: Philip Yong, Chung-Li; Yu-Kun Chen; Moon-Sun Lin, both of Hsinchu; Jason S. Lin, I-lang Hsien, all of Taiwan

[73] Assignee: Trace Storage Tech. Corp., Hsinchu, Taiwan

[21] Appl. No.: 09/026,111

[22] Filed: Feb. 19, 1998

[51] Int. Cl.$^7$ .................................. C08J 7/04; B05D 5/12
[52] U.S. Cl. .................. 427/510; 427/131; 427/132; 427/240; 427/261; 427/385.5; 427/404; 427/407.1; 427/416; 427/558; 427/559; 427/595; 428/65.4; 428/65.5; 428/65.8; 428/694 TC; 428/694 TF; 428/900
[58] Field of Search ........................ 427/131, 132, 427/558, 559, 510, 595, 240, 261, 385.5, 404, 407.1, 416; 428/65.4, 65.5, 65.8, 694 TC, 694 TF, 900

[56] References Cited

U.S. PATENT DOCUMENTS 5,650,900 7/1997 Wei et al. .

*Primary Examiner*—Bernard Pianalto
*Attorney, Agent, or Firm*—W. Wayne Liauh

[57] ABSTRACT

A magnetic disk having improved tribological characteristics in the data zone of the disk surface while retaining a low sliding stiction in the landing zone is disclosed. It contains the conventional elements of a substrate, a magnetic recording layer, a protective overcoat, and a lubricant layer on the protective overcoat. However, the lubricant layer is UV irradiated under a photo mask to cause a radially inner zone and a radially outer zone. The photo mask is designed so that the radially outer zone of the lubricant layer has a ratio of bonded/unbonded lubricant molecules greater than that in the radially inner zone. The reduced proportion of mobile lubricant molecules in the data zone prevents the lubricant molecules from being collected by the magnetic head. On the other hand, a large proportion of the lubricant molecules in the landing zone remained mobile. This allowed the sliding stiction in the landing zone to stay at the desiredly low value. All these were achieved with a uniform-thickness lubricating layer, thus ensuring thermodynamically stability.

9 Claims, 2 Drawing Sheets

METHOD FOR MAKING MAGNETIC DISKS WITH UNEVEN DISTRIBUTION OF BONDED/UNBONDED LUBRICATING MOLECULES

FIELD OF THE INVENTION

The present invention relates to a method for making magnetic discs having a lubricant layer with improved tribological characteristics, and the magnetic discs prepared therefrom. More specifically, the present invention relates to magnetic discs, and the method for making the same, containing an improved lubricant layer which allows optimum static friction, or stiction, in the landing zone (i.e., the inner zone) while maintaining a low flying stiction in the data zone (i.e., the outer zone). The method disclosed in the present invention is most suitable for making magnetic discs with magneto-resistive heads, wherein the air bearing sliders are flying at a substantially lower height over the hard disk surface than in the conventional magnetic discs with thin film magnetic heads.

BACKGROUND OF THE INVENTION

Thin film magnetic hard disks have become an integral item in today's ever-present computers to store digital information. A thin film magnetic hard disk typically contains a magnetic recording thin film formed on a supporting substrate. In order to enhance the durability of the hard disk, a protective overcoat of a very hard material, typically an amorphous carbon, is applied, typically by sputtering, over the magnetic recording layer. The amorphous carbon overcoat typically has a diamond-like structure. The overcoat is usually lubricated to further reduce wear of the disk due to contact with the magnetic head assembly. Typically, the lubricant layer is a molecularly thin layer with a thickness less than 50 Å, and consisting of 2 to 4 layers of lubricant molecules.

Tribologically speaking, the hard disk surface can be divided into a landing zone, which corresponds to the inner diameter portion of the disc surface, and a data zone, which corresponding to the outer diameter portion of the disc surface. During the stationary stage, the magnetic head is positioned in the landing zone, which also called the CSS (constant start stop) zone. After powered on, the hard disk begins to spin, and the magnetic head will begin to take off from the landing zone. During read/write operations, the magnetic head is caused by the actuator arm to move horizontally to the desired location in the data zone. During power-off, the magnetic head is moved, again by the actuator arm, back to the landing zone. Throughout the entire power on-off operation, the magnetic head takes off and lands, respectively, only once. During each take-off or landing, the magnetic head will glide on the hard disk surface at least for a short distance. Thus, the wear between the magnetic head and the disc surface becomes a very important consideration in the hard disk design. Typically, the hard disk surface is made to have a non-uniform surface roughness, with the landing zone having a greater average roughness, Ra, than that in the data zone. A lubricant layer of appropriate thickness, typically 10 to 50 Å or about 2 to 4 layers of lubricant molecules, is also required to reduce the stiction between the magnetic head and the hard disk surface.

Because stiction is an important consideration affecting the service life of a magnetic disc, it is often tested during production runs of magnetic discs using the so-called CSS (constant start stop) procedure, by which the magnetic head is first placed in the landing zone. Then the hard disk is caused to spin and the magnetic head is caused to take off. Thereafter, the spinning of the hard disk is stopped and the magnetic head is caused to land. The amount of stiction is recorded as a function of time, and the test is repeated until a predetermined amount of wear is detected. The stiction data, including the entire histogram, as well as the average value and standard deviation thereof, can provide important information in the design and manufacturing of hard disks. It can provide important information in the prediction of the service life of a hard disk.

While the magnetic head takes off and lands only once, respectively, during each on-off period of the computer, it constantly flies over the data zone of the hard disk surface during computer power-on. A flying stiction test has been designed to understand the tribological characteristics of the hard disk between the take-off and landing of the magnetic head. In this test, the magnetic head is allowed to fly over the data zone of the hard disk surface for several hours, typically four hours, and the amount of stiction is recorded. This is called flying stiction data.

With conventional thin film heads, the flying stiction over the flying zone is comparable to the sliding stiction in the CSS zone. However, it has been observed that, with the high density magnetic-resistive heads, the measured flying stiction is considerably higher than the sliding stiction. This relatively high flying stiction associated with the use of magnetic-resistive heads is probably attributed to the lower flying height of magnetic-resistive heads. With the conventional thin film heads, the flying height is typically about $2.0\mu$ (or about 500 Å). On comparison, the flying height with the magnetic-resistive head is about $1.0\mu$ (or about 250 Å). The lower flying height associated with the magnetic-resistive head causes the flying stiction to be substantially increased.

The low flying height of the magnetic-resistive heads also causes another problem. Typically, about 4 Å of the lubricant molecules in the lubricating layer are bonded to the overcoat (i.e., the diamond-like carbon protective overcoat). The rest of them are unbonded, or mobile, molecules. At the low flying height, the magnetic head can pick up, and has shown to have picked up, some lubricant molecules due to van der Waal and/or other intermolecular forces. The lubricant molecules accumulated on the magnetic head will also be dumped onto the loading zone, causing an increase in the sliding friction between the magnetic head and the hard disk surface in the landing zone. This may result in difficulties in landing and take-off of the magnetic head.

A number of patents have taught methods for reducing mobile lubricant molecules by bonding at least a portion of the mobile lubricant molecules to the hard disk surface. U.S. Pat. No. 4,642,246, the content thereof is incorporated herein by reference, discloses a process for covalently bonding a sufficient portion of a functionalized lubricant to the surface of the hard disk by heating.

U.S. Pat. No. 4,960,609, the content thereof is incorporated herein by reference, discloses a process for bonding a fluoroether lubricant to a thin film magnetic recording disk including the step of exposing the lubricated disk to a plasma of an essentially inert gas.

U.S. Pat. No. 5,030,478, the content thereof is incorporated herein by reference, discloses a process for bonding the lubricant to the overcoat which includes the step of irradiating the lubricated disk by UV radiation.

The prior art methods of bonding lubricant molecules to the hard disk also reduce the amount of mobile lubricant molecules in the landing zone. This can increase sliding stiction and cause problems in the taking off and landing of magnetic heads.

U.S. Pat. No. 5,650,900, the content thereof is incorporated herein by reference, discloses a process for magnetic hard disks with zoned lubricant thickness by which a uniform layer of lubricant is first coated over the disk. Then, lubricant is removed from the distinct zones by solvent removal over a periphery of the disc and by removal by laser, so as to form multiple lubricant thickness zones. Thermodynamically speaking, the non-uniform thickness zones cannot be stable, and, over time, the mobile lubricant molecules will migrate from the thick zones to the thin zones and destroy the object of this invention.

SUMMARY OF THE INVENTION

The primary object of the present invention is to develop a novel method for preparing magnetic hard disks with improved tribological characteristics. More specifically, the primary object of the present invention is to develop an improved magnetic hard disk which allows the magnetic head to fly low over the hard disk surface in the data zone with minimum pickup of lubricant molecules so as to allow a low sliding stiction to be maintained in the landing zone of the hard disk surface.

In the method disclosed in the present invention a uniform lubricant layer is formed above the amorphous carbon overcoat, which serves as a protective layer for the underlying magnetic recording layer provided on a supportive substrate. The uniform lubricant layer is then subject to a special treatment, such as a masked UV irradiation, so as to cause an uneven distribution of bonded/unbonded lubricant molecules between the landing zone and the data zone, i.e., a greater ratio of bonded over unbonded lubricant molecules in the data zone than in the landing zone will be achieved. Preferably, the ratio of bonded over unbonded lubricant molecules in the data zone is about 1 or greater. However, this ratio depends on the type of lubricant used and the expected service life of the hard disk.

In the first preferred embodiment of the method disclosed in the present invention, a uniform lubricant layer is applied on the amorphous carbon overcoat. A wide variety of lubricants can be used in the present invention, including PFPE (perfluoropolyethers), Fomblin, Z-DOL (HO—$CF_2$—O—$(CF_2—CF_2O)_m$—$(CF_2O)_n$—$CF_2$—OH), AM2001, AM3001, x-1p, etc. Then a specially designed photo mask is provided above the lubricant layer. The photo mask has first and second zones, approximately corresponding in areal extent to the landing zone and data zone, respectively. The first zone of the photo mask is made to have lower UV transmissivity than the second zone. The hard disk is then UV-irradiated under the specially designed photo mask. As a result of the uneven UV transmissitivy of the photo mask, there will be a correspondingly uneven distribution of bonded/unbonded lubricant molecules in the lubricating layer. The data zone, which is under the portion of the photo mask with a higher UV transimissivity, will have a high proportion of bonded lubricant molecules. On the other hand, the data zone, which is irradiated under the portion of the photo mask with a lower UV transimissivity, will have a lower proportion of bonded lubricant molecules.

One of the main advantages of the method disclosed in the present invention is that the resultant hard disk will have less mobile lubricant molecules in the data zone than in the landing zone. This eliminates or at least minimizes the possibility that they may be picked up by the magnetic head when the latter flies over the data zone at a low flying height, and is achieved without significantly affecting the tribological characteristics of the landing zone. Another main advantage of the present invention is that, unlike the prior art methods, the lubricating layer can be maintained at a relatively more uniform thickness and is thus thermodynamically stable and will endure for an extended period of time.

The first preferred embodiment employs a UV-transmissible photo mask. In the second preferred embodiment, a UV non-transmissive photo mask is used. The photo mask has an off-centered, cone-shaped or sector-shaped opening. The hard disk is subject to UV irradiation while the photo mask is spinning. Because the cone-shaped opening is off-centered, the ratio between the arc length and radial length increases with increased radius. As a result, the radially outer region will have a greater UV exposure than the radially inner region. This causes the ratio of bonded/unbonded lubricant molecules to increase with increased radius. Similar to the first preferred embodiment, an uneven distribution of bonded/unbonded lubricating molecules is obtained in the lubricating layer of uniform thickness.

In the third embodiment, a plurality of openings are formed on a UV non-transmissive photo mask. The openings are provided such that the "areal density", which is defined as the total area divided by the average radial length, is greater in the data zone than in the landing zone. When the hard disk is UV-irradiated under such a spinning photo mask, the data zone, because of the corresponding greater areal density in the photo mask, will receive a higher dosage, per unit area, of UV irradiation. As a result, the ratio of bonded/unbonded lubricant molecules is greater in the data zone than in the landing zone. Again, similar to the first and second preferred embodiments, an uneven distribution of bonded/unbonded lubricating molecules is obtained in a lubricating layer of uniform thickness, with the data zone being provided with a greater ratio of bonded/unbonded lubricating molecules.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

The present invention discloses a novel method for preparing magnetic hard disks with improved tribological characteristics which allow the magnetic head to fly at a very low height over the hard disk surface in the data zone with no or minimum pickup of lubricant molecules so as to allow a low sliding stiction to be maintained in the landing zone of the hard disk surface.

In the method disclosed in the present invention a uniform lubricant layer is formed above the amorphous diamond-like carbon overcoat, which serves as a protective layer for the underlying magnetic recording layer provided on a supportive substrate. The uniform lubricant layer is then subject to a masked UV irradiation, so as to cause an uneven distribution of bonded/unbonded lubricant molecules between the landing zone and the data zone. With the present invention, a greater ratio of bonded over unbonded lubricant molecules is achieved in the data zone than in the landing zone. Preferably, the ratio of bonded over unbonded lubricant molecules in the data zone is about 1 or greater. However, this ratio depends on the type of lubricant used and the expected service life of the hard disk.

One of the main advantages of the method disclosed in the present invention is that the resultant hard disk has a substantially reduced extent of mobile lubricant molecules in the data zone while allowing the landing zone to maintain a relatively high extent of mobile lubricant molecules. This eliminates or at least minimizes the possibility that the mobile lubricant molecules may be picked up by the magnetic head when the latter flies over the data zone at a low flying height. This is achieved without significantly affecting the tribological characteristics of the landing zone. Another main advantage of the present invention is that, unlike prior art methods, the lubricating layer can be maintained at a relatively more uniform thickness prior to the UV irradiation and is thus thermodynamically more stable and will endure for an extended period of time.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Figure 1:
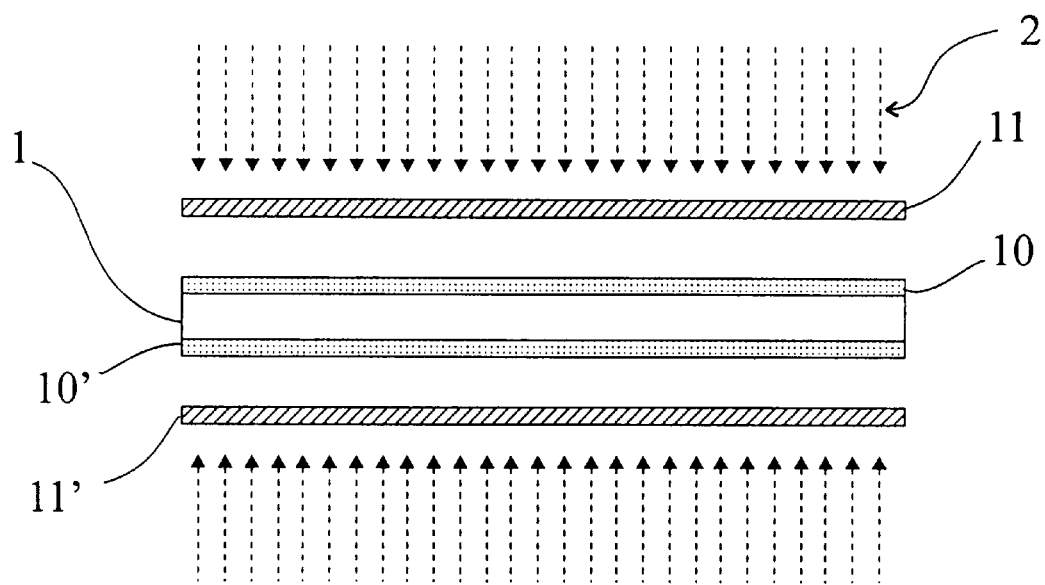
FIG. 1 is an illustrative cross-sectional view of the hard disk of the present invention when it is UV-irradiated under a specially designed photo mask, in accordance with the first preferred embodiment.

FIG. 1 is an illustrative cross-sectional view of the hard disk of the present invention when it is UV-irradiated under a specially designed photo mask, in accordance with the first preferred embodiment. FIG. 1 shows that a pair of lubricant layers of uniform thickness 10, 10' were applied on the top and bottom surfaces of a hard disk 1. A wide variety of lubricants can be used in the present invention, including PFPE (perfluoropolyethers), Fomblin, Z-DOL (HO—$CF_2O$—$(CF_2$—$CF_2O)_m$—$(CF_2O)_n$—$CF_2$—OH), AM2001, x-1p, etc. The lubricant layer can be formed using a variety of techniques such as dipping, spinning, spraying, vapor deposition, etc.

Then, a specially designed photo mask 11 or 11' is provided above the lubricant layer. The photo mask 11 or 11, which was made of $MgF_2$, had a first zone, 5 or 5' and a second zone, 6 or 6' approximately corresponding in area to the landing zone, 3 or 3' and data zone, 4 or 4', respectively, of the hard disc 1. The first zone of the photo mask was made to have higher UV transmissivity than the second zone. The hard disk was then UV-irradiated under the specially designed photo mask 11 and 11'. Because UV irradiation can cause oxygen to become ozone, which, in turn can damage the amorphous carbon protective layer, it is preferred that the UV irradiation be conducted in an inert gas environment, such as a nitrogen chamber.

As a result of the uneven UV transmissitivy of the photo mask, a correspondingly uneven distribution of bonded/unbonded lubricant molecules in the lubricating layer was achieved. The data zone, which was exposed to the UV irradiation under the portion of photo mask with a higher UV transimissivity, was formed to have a high proportion of bonded lubricant molecules. On the other hand, The landing zone, which was exposed under the portion of photo mask with a lower UV transimissivity, was formed to have a lower proportion of bonded lubricant molecules. The photo mask can also be designed such that the landing zone receives little or no UV irradiation. The reduced proportion of mobile lubricant molecules in the data zone prevents the lubricant molecules from being collected by the magnetic head. On the other hand, a large proportion of the lubricant molecules in the landing zone remained mobile. This allowed the sliding stiction in the landing zone to stay at the desiredly low value. All these were achieved with a uniform-thickness lubricating layer, thus ensuring thermodynamically stability.

EXAMPLE 2

Figure 2:
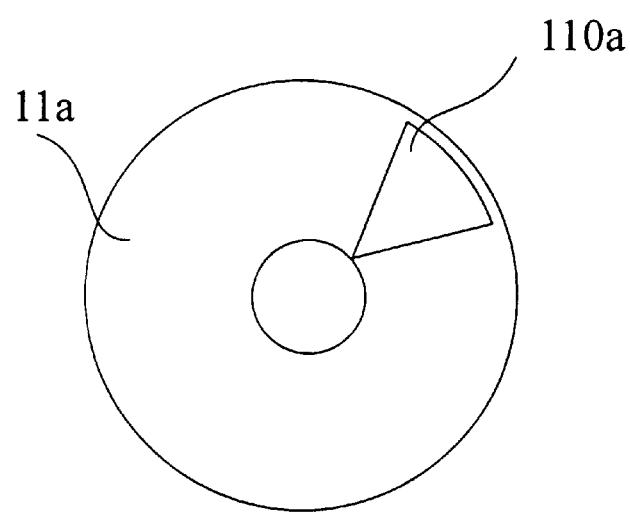
FIG. 2 is an illustrative top view of the specially designed photo mask for use during the second preferred embodiment of the present invention.

In the first preferred embodiment, a UV-transmissible photo mask was employed. In the second preferred embodiment, on comparison, a UV non-transmissive photo mask was used. The photo mask 11a had an off-centered cone-shaped opening 110a, as shown in FIG. 2. The hard disk was subject to UV irradiation while the photo mask was spinning. Because the cone-shaped opening is off-centered, the ratio between arc length and the corresponding radial length increases with increased radius. As a result, the radially outer region had a longer UV exposure time per unit area than the radially inner region. This caused the ratio of bonded/unbonded lubricant molecules to increase with increased radius. Similar to the first preferred embodiment, an uneven distribution of bonded/unbonded lubricating molecules was achieved in the lubricating layer of uniform thickness. The data zone, because of its longer UV exposure, had a greater extent of bonded lubricant molecules. With the second embodiment, the ratio of bonded/unbonded lubricant molecules continuously increased with radius.

EXAMPLE 3

Figure 3:
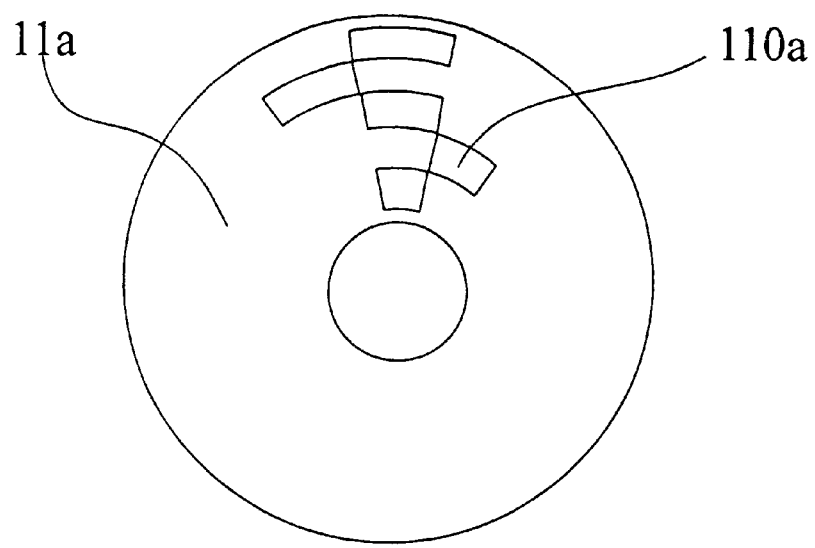
FIG. 3 is an illustrative top view of the specially designed photo mask for use during the third preferred embodiment of the present invention.

FIG. 3 is an illustrative top view of the specially designed photo mask for use during the third preferred embodiment of the present invention. In the third embodiment, a plurality of openings were formed on a UV non-transmissive photo mask. The openings were provided such that the "areal density", which was defined as the total area divided by the average radial length was greater in the data zone than in the landing zone. When hard disk was UV-irradiated under such a spinning photo mask, the data zone, because of the corresponding greater areal density in the photo mask, received a higher dosage of UV irradiation per unit area. As a result, the ratio of bonded/unbonded lubricant molecules was greater in the data zone than in the landing zone. Again, similar to the first and second preferred embodiments, an uneven distribution of bonded/unbonded lubricating molecules is obtained in a lubricating layer of uniform thickness, with the data zone being provided with a greater ratio of bonded/unbonded lubricating molecules.

FIG. 3 shows that the mask openings had a sector shape and are not aligned. The non-alignment ameliorated the potential loss of rigidity of the photo mask since the voids were spread circumferentially (also radially). The sector-shaped openings were designed such that the ratio of arc length over average radial length increased with radius.

EXAMPLE 4

Figure 4:
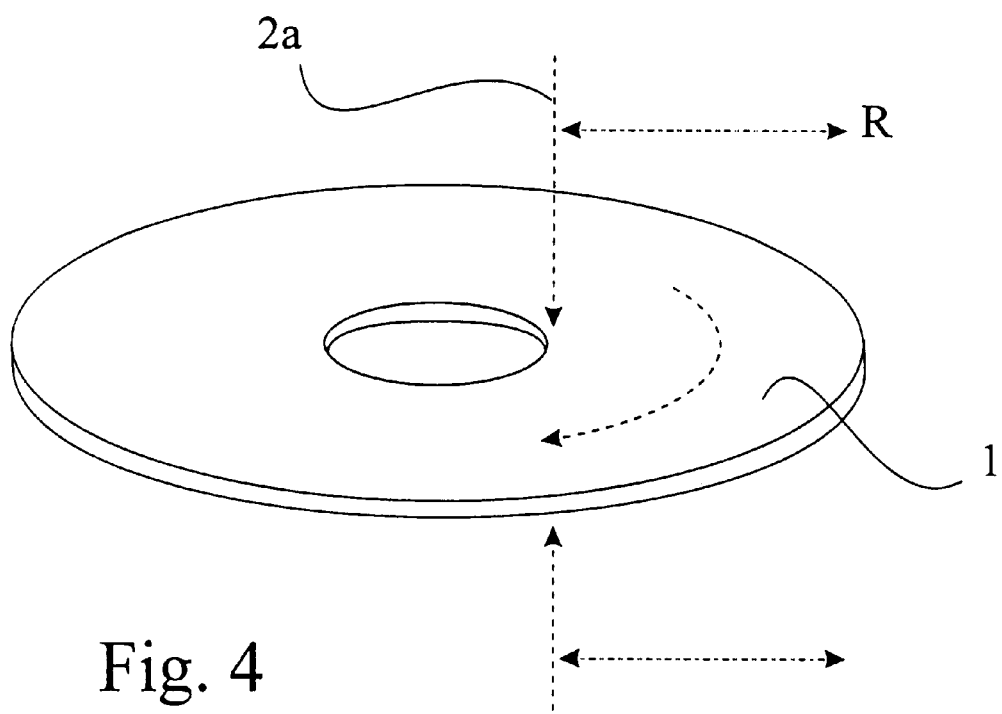
FIG. 4 is an illustrative diagram showing the spinning of the hard disk during the fourth preferred embodiments of the present invention which utilizes a UV laser beam for irradiating the lubricant molecules.

The fourth embodiment, unlike all three previous embodiments, did not use a mask. Instead, it employed a UV laser beam and caused the hard disk to spin. FIG. 4 is an illustrative diagram showing the spinning of the hard disk 1 during the fourth preferred embodiments of the present invention which utilizes a UV laser beam 2a for irradiating the lubricant molecules. The UV laser irradiation is caused to move radially in the radial direction R in such a manner that the irradiation time per circumferential length is greater in the outer region of the lubricant layer than the inner region, so as to result in a greater ratio of bonded/unbonded lubricant molecules to be attained in the outer region of the lubricant layer than in the inner region of the lubricant layer.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A process for making magnetic disks comprising the steps of:
   (a) forming a magnetic recording layer on a substrate;
   (b) forming a protective overcoat on said magnetic recording layer;
   (c) forming a lubricant layer of uniform thickness on said protective overcoat; and
   (d) while maintaining the thickness of said lubricant layer uniform, subjecting said lubricant layer to a masked UV irradiation to cause at least a portion of lubricant molecules in said lubricant layer to be bonded to said protective overcoat;
   (e) wherein said mask UV irradiation is structured to have a higher light transmissivity in its outer zone than its inner zone so as to cause a greater number of the lubricant molecules per unit area to be bonded to said protective overcoat in an outer zone of said lubricant layer than in an inner zone.

2. The process for making magnetic disks according to claim 1 wherein said masked UV irradiation is conducted such that said ratio of bonded/unbonded lubricant molecules in said radially outer zone of said lubricant layer is greater about 20%.

3. The process for making magnetic disks according to claim 1 wherein said masked UV irradiation is conducted such that said ratio of bonded/unbonded lubricant molecules in said radially outer zone of said lubricant layer is greater about 50%.

4. The process for making magnetic disks according to claim wherein said masked UV irradiation step comprises the sub-steps of:

(a) providing a photo mask having an off-centered sector-shaped opening which allows more light to transmit therethrough per unit area in the outer region than the inner region when said magnetic disk is spined;
   (b) causing said photo mask to spin relative to said lubricant layer; and
   (c) irradiating UV through said spinning photo mask and onto said lubricant layer until a predetermined proportion of bonded/unbonded lubricant molecules can be expected in said outer zone of said lubricant layer.

5. The process for making magnetic disks according to claim 1 wherein said masked UV irradiation step comprises the sub-steps of:
   (a) providing a photo mask having a plurality of openings, wherein said openings are provided such that its areal density, which is defined as the total areal opening divided by the radial length, is greater in an outer zone than in an inner zone of said photo mask;
   (b) causing said photo mask to spin relative to said lubricant layer; and
   (c) irradiating UV through said spinning photo mask and onto said lubricant layer until a predetermined proportion of bonded/unbonded lubricant molecules can be expected in said outer zone of said lubricant layer.

6. The process for making magnetic disks according to claim 1 wherein said masked UV irradiation step is conducted in an inert environment.

7. The process for making magnetic disks according to claim 1 wherein said protective overcoat is an amorphous carbon overcoat.

8. The process for making magnetic disks according to claim 1 wherein said protective overcoat is a diamond-like amorphous carbon overcoat.

9. A process for making magnetic disks comprising the steps of:
   (a) forming a magnetic recording layer on a supportive substrate;
   (b) forming a protective overcoat on said magnetic recording layer;
   (c) forming a lubricant layer of uniform thickness on said protective overcoat;
   (d) while maintaining the thickness of said lubricant layer uniform, causing said supportive substrate to spin; and
   (e) irradiating a UV laser beam on said lubricant layer while said supportive substrate is spinning;
   (e) wherein said UV laser irradiation is caused to move radially in such a manner that the irradiation time per circumferential length is greater in an outer region of said lubricant layer than an inner region, so as to result in a greater density of bonded lubricant molecules per unit area to be attained in said outer region of said lubricant layer than in said inner region of said lubricant layer.

* * * * *